(12) United States Patent
Farrell et al.

(10) Patent No.: US 7,847,956 B2
(45) Date of Patent: Dec. 7, 2010

(54) METHOD AND SYSTEM FOR PRINTER OPTIMIZATION

(75) Inventors: Michael E. Farrell, Williamson, NY (US); David C. Robinson, Penfield, NY (US); Javier A. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1363 days.

(21) Appl. No.: 11/332,620

(22) Filed: Jan. 13, 2006

(65) Prior Publication Data

US 2007/0165258 A1 Jul. 19, 2007

(51) Int. Cl.
*G06F 3/12* (2006.01)
(52) U.S. Cl. .................. 358/1.13; 358/1.1; 358/1.9; 358/1.15; 755/764; 755/810
(58) Field of Classification Search .................. 358/1.1, 358/1.9, 1.13, 1.15; 715/255, 764, 810
See application file for complete search history.

(56) References Cited

U.S. PATENT DOCUMENTS

| | | | | |
|---|---|---|---|---|
| 5,964,156 | A * | 10/1999 | Smith et al. | 358/1.18 |
| 6,741,262 | B1 * | 5/2004 | Munson et al. | 358/1.9 |
| 2002/0116439 | A1 * | 8/2002 | Someshwar et al. | 358/1.15 |
| 2003/0126316 | A1 * | 7/2003 | Parker | 710/15 |
| 2004/0199865 | A1 * | 10/2004 | Bie et al. | 715/500 |
| 2005/0213132 | A1 | 9/2005 | Uejo | |
| 2006/0203257 | A1 * | 9/2006 | McLuckie et al. | 358/1.1 |
| 2008/0084574 | A1 * | 4/2008 | McDonald et al. | 358/1.15 |

OTHER PUBLICATIONS

Davis, David; Prepared by Interquest, Ltd.; Workflow for the New Business of Printing; Xerox Corporation; Freeflow™ White Paper.
Xerox Freeflow™; Freeflow™ Performance Accelerated; c. 2005 Xerox Corporation; www.Xerox.com/Freeflow.
High End Expectations . . . high end color; CXP6000™ Color Server for the Xerox DocuColor® 6060 Digital Color Press; c. 2002 Xerox Corporation.
Xerox FreeFlow Digital Worklflow Collection; DocuSP: Power your engines to new heights;FreeFlow DocuSP print controller; c. 2005 Xerox Corporation.
PrintXchange Command Line Interface Reference Guide; Version 1.2; 613P07260; May 1998; c. 1997-1998 Xerox Corporation.

* cited by examiner

*Primary Examiner*—Kimberly A Williams
(74) *Attorney, Agent, or Firm*—Duane C. Basch; Basch & Nickerson LLP

(57) ABSTRACT

Disclosed are systems and methods enabling a user to select optimal parameters for a printing job. The systems and methods disclosed are directed to facilitating the adjustment of printing parameters based upon at least the knowledge of a particular aspect of a printing environment (e.g., printer) and further including the ability to dynamically adjust parameters in relation to dynamically adjustable parameters, wherein the parameters may be determined as a function of other specified parameters.

27 Claims, 5 Drawing Sheets

METHOD AND SYSTEM FOR PRINTER OPTIMIZATION

Disclosed are systems and methods enabling a user to select parameters optimal for a printing job and more particularly, the optimization of such parameters with respect to particular printers and rendering systems.

BACKGROUND AND SUMMARY

The benefit of an automated workflow system is the minimization of deviations and fluctuations in processes of the workflow, and maximization of the use of resources. Printing is a highly customized manufacturing activity and automation has not come easy. Prepress was the first segment of conventional print production to be computerized, and scripting languages and 'hot folder' techniques have been employed to route files from one process to the next. Consoles for controlling on-press color balance and registration came next, followed by computer-to-plate and direct imaging presses. Overall, however, efforts at end-to-end automation are ongoing.

Although the particulars differ, the workflow challenges facing all printing professionals are similar, and they emanate from a combination of market forces, and both internal and external equipment and process incompatibilities, including:

Ever shortening run lengths and turnaround requirements;

Manual intervention in production and administrative processes;

Discreet, process and application specific workflows; and

Limited interoperability between equipment and software components

Color digital front ends (DFEs) and other prepress interfaces, including print-shop or web-based systems, provide users with numerous controls for manipulating color and image quality for a printing job being submitted. Often, however, default values for these controls are determined by someone other than the user, yet the settings attempt to provide a reasonable balance of image quality and performance for the majority of expected input. Unfortunately, the default values frequently reflect casual user priorities, where performance is more important than image quality. Consequently, the default values may not produce optimal image quality for many print workflows and many do not produce acceptable image quality for a user's particular workflow(s).

Not only is it the above situation a problem with prepress settings, but it is also true that some problems in rendering high quality printed output originate with the files received by print shops. Moreover, the file problems can, in some cases, be further traced back to poor selections the user made when printing a document from the source application.

As automated prepress systems become more feature-rich and increasingly prevalent in various types of print shops, there is a greater need to ensure that individual process node job parameters are optimized, and remain consistent with each other. Currently, the person setting up the automated workflows must ensure that all parameters in all process nodes (e.g., services) are consistent with each other. Should there be a change in one of the processing parameters (e.g. a print node is changed to use a different printer model), then the operator must ensure that all process nodes that take into account the printer modes (e.g. proofing, preview, color management, etc.) are updated to reflect the new printer model in the print node. The manual synchronization of job parameters that are dependent on each other becomes an increasing source of errors as more and more capabilities are added to automated prepress systems.

A known practice by some is to provide user documentation—Hints and Tips (e.g., recommended settings for their equipment on their web sites)—advising users on the preferred settings to achieve optimal image quality. Other print shops actually distribute creative application (e.g. Quark Xpress) "Printer Styles" to their customers. Print shops with more established customer relationships may even go so far as using systems like Creo Synapse to enforce the use of "printer styles." The distribution, adoption, and retention of such tools and information is, unfortunately, not widespread. If a user adopts certain recommendations, they can save the preferred settings in a job ticket, or equivalent job programming acceleration mechanisms such as queue or virtual overrides, but they need to remember, at a later time, to use the specific ticket for the selected printer.

In spite of the availability of such information, it is believed that many print shop customers are simply not going to avail themselves of the tools and information mentioned above when creating print files for submission of their print jobs to the print shops. In response to the noted difficulties, the systems and methods disclosed herein provide users of print job programming software applications with an additional set(s) or collection(s) of pre-set or default values that will vary based on at least the printer configuration. Specifically the initial color and image quality settings would be determined as a function of the printer selection and applied upon request of the user.

In one embodiment, the color and image quality settings would be packaged as a persistent data structure, so the user could further customize the settings and revisions could be delivered and installed easily. In this context, the key aspects of the printer configuration are the print station model and the DFE software release (includes vendor, base release, patches, etc.). The following disclosure further contemplates a system and mechanism for extending current printing functionality to automatically configure applications with recommended print settings for a specific type of printing. More specifically, automatically evaluating document characteristics in a source application and pre-configuring a postscript printer description (PPD) file(s) selection, operating system print driver selections and application print selections to a set of optimal print settings based on the type of printer selected by the end user.

As a further enhancement, the following disclosure teaches the use of parameters in automated workflows wherein certain parameter values can be derived from the value of other parameters. In other words, when selecting certain parameters, the user would have the option to specify that the value for a parameter should be dynamically derived from another parameter value in the workflow (generally from a different operation in the workflow). When the user selects a dynamic value for a specific workflow parameter then the system will dynamically adjust the value of that parameter based on the value of the source parameter in the workflow.

Disclosed in embodiments herein is a method for defining a print job, comprising: providing a collection of printing parameters, wherein the collection includes a plurality of selectable values as a default for at least one printing parameter; recording a user's selection of one of the plurality of selectable default values in association with a persistent data structure; and submitting the user's selection for printing in association with a print job.

Embodiments described herein also disclose a method for controlling the execution of a print job, comprising: providing a plurality of services related to printing of the print job for incorporation into the print job workflow; displaying, via a user interface, a plurality of parameters that control the workflow and the plurality of services in order to obtain printed output as desired by a user; and selecting at least one parameter for control of at least one of the plurality of services, wherein said selected parameter is derived from at least one other parameter specifying the workflow.

Further disclosed in embodiments herein is a method for improving output quality on a digital printing device, comprising: providing a collection of printing parameters for use by the digital printing device, wherein the collection includes a plurality of selectable values as a default for at least one parameter; recording a user's selection of one of the plurality of selectable values in association with a persistent data structure; and submitting the user's selection for printing by the digital printing device in association with a print job.

Also disclosed in embodiments herein is a print management system for managing print services, comprising: a processor that controls the print services according to a print instruction including a request to produce printed matter; an acquiring unit that acquires unique data indicative of characteristics of a print service and associates the characteristics with a persistent data structure that can be interpreted by the processor; a client terminal for generation of the print instruction, the instruction being described in the persistent data structure that can be interpreted by the processor and is based on the unique data indicative of characteristics of the print service; and an output unit for generating a printed output in response to the print instruction.

DETAILED DESCRIPTION

As more particularly set forth below, the disclosed system and methods address a problem arising from the use of default or non-optimized parameter values for color management and image quality in several color digital front end systems. In order to properly characterize the various aspects of the system and methods, an exemplary embodiment is first described relative to FIG. 1.

Figure 1:
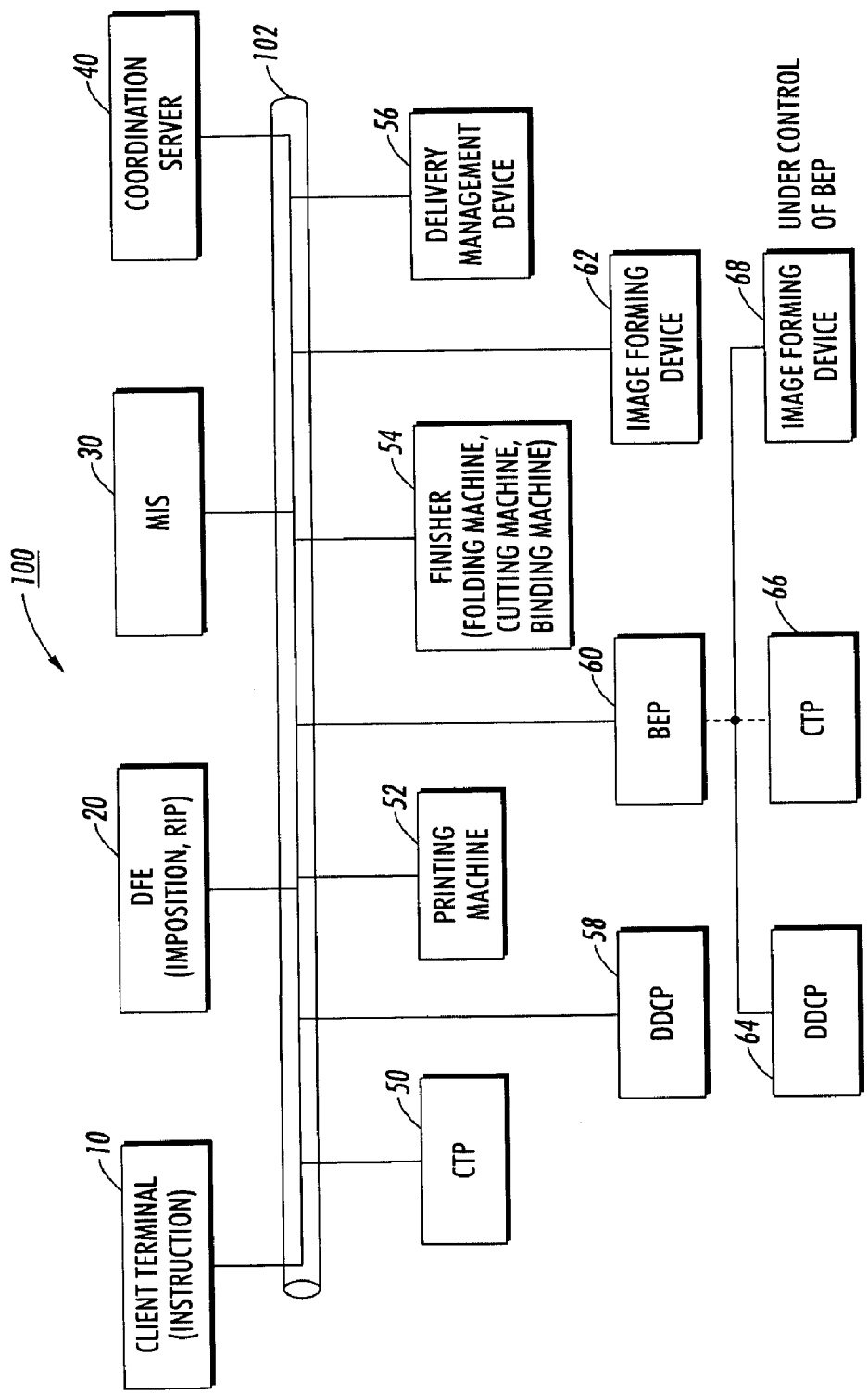
FIG. 1 is a block diagram showing a print system in accordance with an embodiment described herein.

Referring to FIG. 1, there is depicted a print processing system 100 which may be obtained by connecting devices for realizing various services related to print processing through a network 102. In this case, the services mean functions that are related to printing and can be utilized in response to an external print or print job request. The services correspond to, for example, formation of layout data, imposition, data conversion, formation of a printing plate, printing, folding, cutting, and binding processes. However, the services are not limited to these processes.

More specifically, the print processing system 100 includes a client terminal 10 having a user interface that controls and instructs print job processing for ultimately obtaining a printed document desired by a user. The system performs or provides a plurality of services, including: a digital front end (DFE) processor device 20, a management information system (MIS) device 30, a coordination server 40, a computer to plate (CTP) device 50, a printer 52, a finisher device 54, and a delivery management device 56.

The digital front end device or service 20 passes print data to an image forming device such as the computer to plate device 50 or a printer 52 and gives a print instruction to the image forming device. The management information system device 30 operates to control which device is assigned to a service, according to a print instruction containing information for a service procedure instructed by the client terminal 10. In this case, the information is described in a predetermined description format (e.g., JDF: Job Definition Format), which may be based upon a postscript printer description or other persistent data structure (e.g., job ticket, job programming mechanism etc.). The coordination server 40 controls devices or programs that are assigned to services according to a print instruction. In one embodiment, the information may be described in another description format. For example, the print instructions described in these description formats can be expressed in a predetermined language (e.g., XML: Extensible Markup Language). In other words, the format may be expressed in XML to generate the print instruction. However, as will be appreciated alternative formats and data communication structures may be employed and the language is not limited to XML.

In one alternative, the documents may be rendered using conventional plate printing. In this alternative, the computer to plate device 50 makes a printing plate directly based on print data without having to generate intermediate products. In such an embodiment, the printer 52 performs printing using the printing plate made based on the print data. The present invention contemplates, however, a digital printing embodiment such as a Xerox DocuColor (iGen or 8000) printer, wherein the data is directly rendered without the need for an intermediate plate.

Once the document are printed, from any of the printer alternatives, the finisher 54 folds, cuts, and/or binds the printed document so that the user obtains desired (e.g., bound) printed output. The delivery management device 56 manages the delivery of the printed matter to the user.

Further, as noted above, the embodiment depicted includes a plurality of printing/output options, for example, a digital direct color proofing (DDCP) device 58, a back end processor (BEP) 60, and an image forming device 62 may be connected to the network 102. The image forming device 62, in a general sense represents one or more device such as a color copying machine, a facsimile, a printer or the like having a so-called printing function, which forms an image on a recording medium by an electrophotographic or other rendering process. The image forming device 62 can have a device configuration, and may further include the functions of the finisher device 54. The DDCP device 58 may be an output device which directly performs print output for color proofing from document image data or an output device that outputs a large-size print imposed for plate making.

The back end processor device 60 is a device including functionality which performs various processing for data obtained by converting print data obtained by instruction from a client to raster data through a process referred to as raster input processing (RIP). The back end processing device 60 can be connected to output devices such as a digital direct color proofing device 64 similar to the digital direct color proofing device 58, a computer to plate device 66 similar to the computer to plate device 50, and an image forming device 68 similar to the image forming device 62. More specifically, under the management of the back end processing device 60, at least one of the digital direct color proofing device 64, the computer to plate device 66, and the image forming device 68 can also be connected therethrough.

The coordination server 40 can be implemented as a processor or plurality of processors in the nature of a server, which retrieves a service desired by a user. Coordination server 40 may include: an instruction generating server which forms a print instruction from information instructed by and received from the client terminal 10, an instruction management server which manages a print instruction, and a coordination processing server which executes coordination processing for services according to the print instruction. In addition, the coordination server 40 can also include an image processing device which performs image processing such as a noise reduction process, an image rotation process, an optical character recognition (OCR) process, and an image binding process for an image document, a document management server which manages the processing of documents, a document delivery server which delivers a document, and a service processing device which performs predetermined service processing.

Service coordination means that the services have relationships (i.e., a workflow as will be discussed below) such that a result of an arbitrary service determines a service to be subsequently activated or affects the operation of a subsequent service. The services, as referred to herein, mean a function related to print processing that can be utilized in response to an external request. The services comprise, for example, copying, printing, scanning, facsimile transmission/reception, mail delivery, storage in a repository, reading from a repository, optical character recognition (OCR) processing, noise reduction processing, and the like. However, the services are not limited to these processes. Therefore, the coordination server 40 coordinates plural services to instruct and manage print processing desired by a user. The coordination server 40 executes a coordination process for the services according to a print instruction on the basis of information related to service coordination in the print instruction. The print processing system 100 has a configuration in which plural devices, which perform predetermined print-related processing, are connected through the network 102 in this embodiment. However, the print processing system 100 is not limited to this configuration as long as plural services are connected.

A series of processes related to printing may be decomposed into plural functional processes, and in such a case, the print instruction refers to data including information representing the relationships between the processes and parameter information used to execute each process. The print instruction is described in a predetermined description format, for example, job definition format (JDF) or the like.

As more particularly set forth below, the disclosed system and methods address a problem that arises from the use of default values for color management and image quality in several color digital front end systems. For example, when such values are not optimal for particular workflows. This problem is often observable in several workflow scenarios, such as:

(a) in digital reprographic jobs created using the FreeFlow MakeReady (or Scan and Print) in conjunction with the Firestar scanner; in the Creo digital front end used for the Xerox DocuColor iGen3, which requires the selection of a high image quality mode for acceptable print quality. For example, in such a scenario the Creo and EFI digital front ends (e.g., for a Xerox DocuColor 8000) typically produce better color image quality when the image source color space is specified as sRGB; and (b) in orthographic printing jobs that can benefit from anti-aliasing and trapping where, due to performance impacts, the default values for both controls are typically "off."

Figure 2:
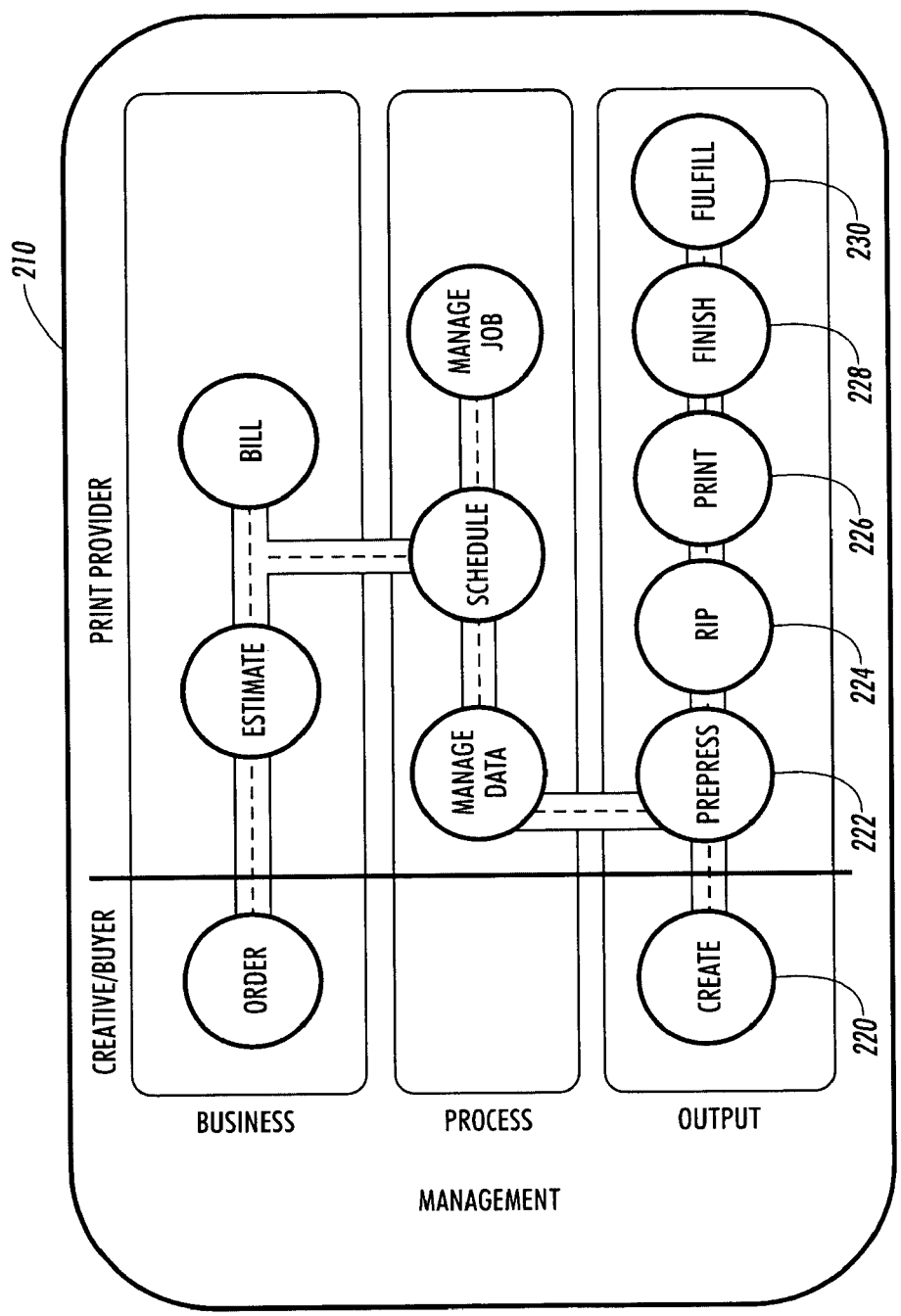
FIG. 2 is an exemplary illustration of a software-based, automated workflow management system in accordance with an embodiment disclosed herein.

One embodiment disclosed herein is an enhancement to existing print job programming software applications capable of submitting jobs to various printers, e.g. FreeFlow Quick Print and FreeFlow Print Manager. FIG. 2, which represents an embodiment of a software-based, automated workflow management system such as Xerox' FreeFlow™ software, is operable with respect to the system depicted in FIG. 1. Referring to FIG. 2, depicted therein is a multi-tiered workflow framework 210. The framework provides an infrastructure for assembling end-to-end workflows from highly modular hardware and software components offered by various providers.

Ever since Apple®, Aldus®, and Adobe® revolutionized publishing, the desktop (creative processes 220) and print production worlds have been moving closer together. Processes that used to be performed on high-end standalone prepress systems are now embedded in print controllers, such as described relative to FIG. 1. Prepress activities 222 encompass an enormous range of processes, which vary dramatically from one environment to the next. As described in general relative to the alternative systems of FIG. 1, so too, the prepress activities of a quick printer are quite different from those of a commercial printer, service bureaus, franchise printers, enterprise or in-house operations, and offices.

The raster input process (RIP) 224 performs a similar role regardless of the target device or process. If the job is conveyed in PDF, for instance, it must be converted from a device independent, displayable format, to device-specific information needed to drive a platemaker, direct imaging press, or digital printer. The RIP process is, therefore, the means by which upstream processes are conveyed to the output device. Raster input processors have also tended to be highly product or process specific, and production personnel have had to learn multiple interfaces and operating systems. Print process 226 is intended to broadly represent the production printing processes, which may include some with very specific and rigid workflows supporting discreet output processes. Similarly, the traditional finishing operations 228 often begin with the process of collating and trimming press sheets. Digital printers, of course, produce fully collated sets and are thus more conducive to on-line finishing and binding (including stapling and tape binding to folding, saddlestitching, and perfect binding). In addition, the combination of one or more of the afore-mentioned processes can be characterized in the fulfillment process 230, representing the output of a job in accordance with the characteristics and parameters defined by a user. The benefit of such an automated workflow system, of course, is that it minimizes deviations and fluctuations in these processes and maximizes the use of resources.

Figure 3:
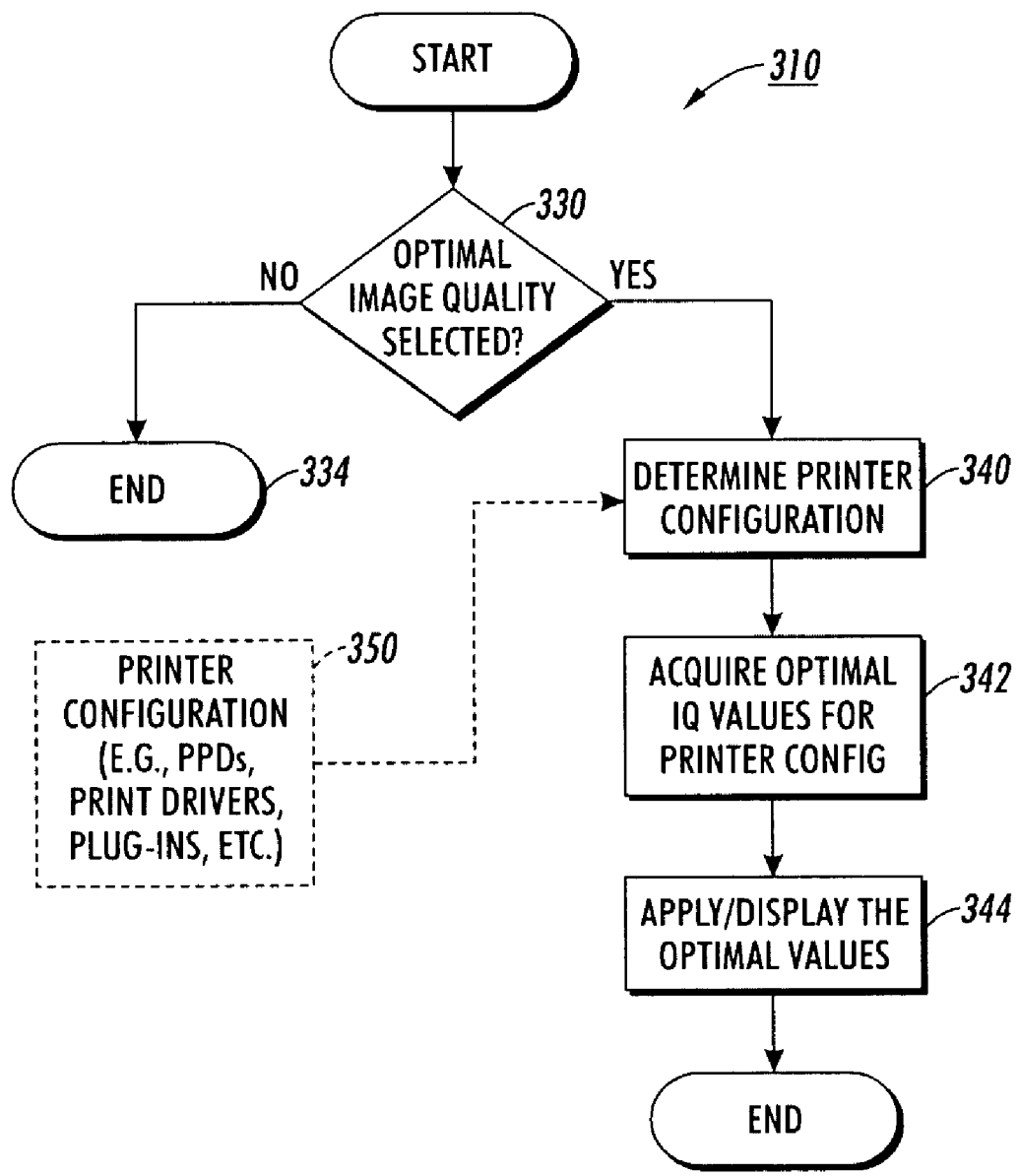
FIG. 3 illustrates an example of a process for carrying out an improved print job programming method.

However, the automation of workflows as described relative to FIG. 3 can lead to the generalization of automation of user input in a manner that could lead to unsatisfactory fulfillment—where the delivered or completed job is not of a quality that is acceptable. Referring also to FIG. 3, depicted therein is an example of a process for carrying out an improved print job programming method. One aspect of the method 310 includes allowing a user to select an optimal color and image quality print mode as part of the job definition. More specifically, at 330, a test is conducted to determine if an "optimal image quality" setting has been selected by a user (e.g., via a user interface such as a dialog window). If not, no further processing is required as indicated by step 334. However, in response to a selection of optimal image quality, the print job programming software first determines the printer configuration (340) and then acquires the optimal color and image quality settings for the printer (342), based upon the printer configuration. Once the optimal image quality settings are acquired, the process then presents these to the user as initial or "default" settings.

It will be appreciated that the optimal color and image quality settings could be obtained via a number of mechanisms including a local file or database entry, querying the print service, or querying a central directory or repository. The optimal initial or default values for each printer would be determined through engineering analysis or product integration testing, but would then be available either directly from the printer or via one of the above-mentioned data repositories.

For example, the described process of FIG. 3 may be accomplished in the context of a Postscript® print driver where the optimal image quality and color values are packaged in a Postscript printer description (PPD) file as a variant of the base printer. By offering a user additional initial settings that are related to a particular printer or output process and may be used as "default" settings, the method disclosed in FIG. 3 provides for the provision of an optimal image quality selection from multiple collections of settings within a print job programming software application. Typically, dialog windows are used to provide a mechanism to reset some or all attribute selections to a single collection of default values. Existing print job programming application software can present different attributes as a function of the printer selected (e.g. color controls are not displayed for black-only printers).

As alternatives, the method of FIG. 3 further contemplates providing to a user, again in a dialog window or similar interface, a plurality of selectable collections of job settings associated with a logical group of attributes (e.g. color and image quality attributes, paper attributes, finishing attributes). Additionally, the user may be provided with the ability to customize the collections of values for both the attribute value and the attributes within the collection. In other words, allowing the user to change the optimal image quality default—such as changing the RGB color space settings from sRGB to Adobe RGB. It should also be appreciated that the system may not only permit such selections, but would further facilitate the storage of such selections (both with respect to the job definition as well as for subsequent use) in a memory or other repository where they can be later recalled. Such storage may be localized (user terminal 10 of FIG. 1), or via a networked storage device such as disk or similar storage media (associated with coordination server 40 of FIG. 1).

The approach of adding the intelligence for producing optimum image quality and color in the submission software application complements the delivery of professional services for production printing. The service provider can install and customize the defaults thereby providing value add, without requiring digital front end systems to offer different modes or additional intelligence.

Printer descriptions, such as described relative to step 340 in FIG. 3, are currently distributed in the form of postscript printer description files (PPDs) 350. These PPDs contain basic information about the print device capabilities. As an aspect of the disclosed method of FIG. 3, it will be appreciated that the PPDs may also contain information about default PPD settings. Moreover, this mechanism may include printer-specific operating system and application recommended settings—to cover more than a printer configuration. Although the following description is set forth in reference to PPD functionality (since PPDs are the most widely used method for distributing information about specific print drivers), the exemplary description is not intended to preclude an alternate delivery method such as a custom print driver, application-specific plug-ins or even a lookup mechanism (e.g. web-based or directory) to query centrally managed recommended settings.

In one embodiment, the printer description file would be further extended to contain information about preferred settings for both specific operating systems and specific applications within those operating systems. For example, an enhanced PPD may specify enabling Image Anti-Aliasing, which enhances the appearance of low-resolution images, when printing from MS-Word and disabling it when printing from Quark XPress. This information is then used by the system during printer selection.

Figure 4:
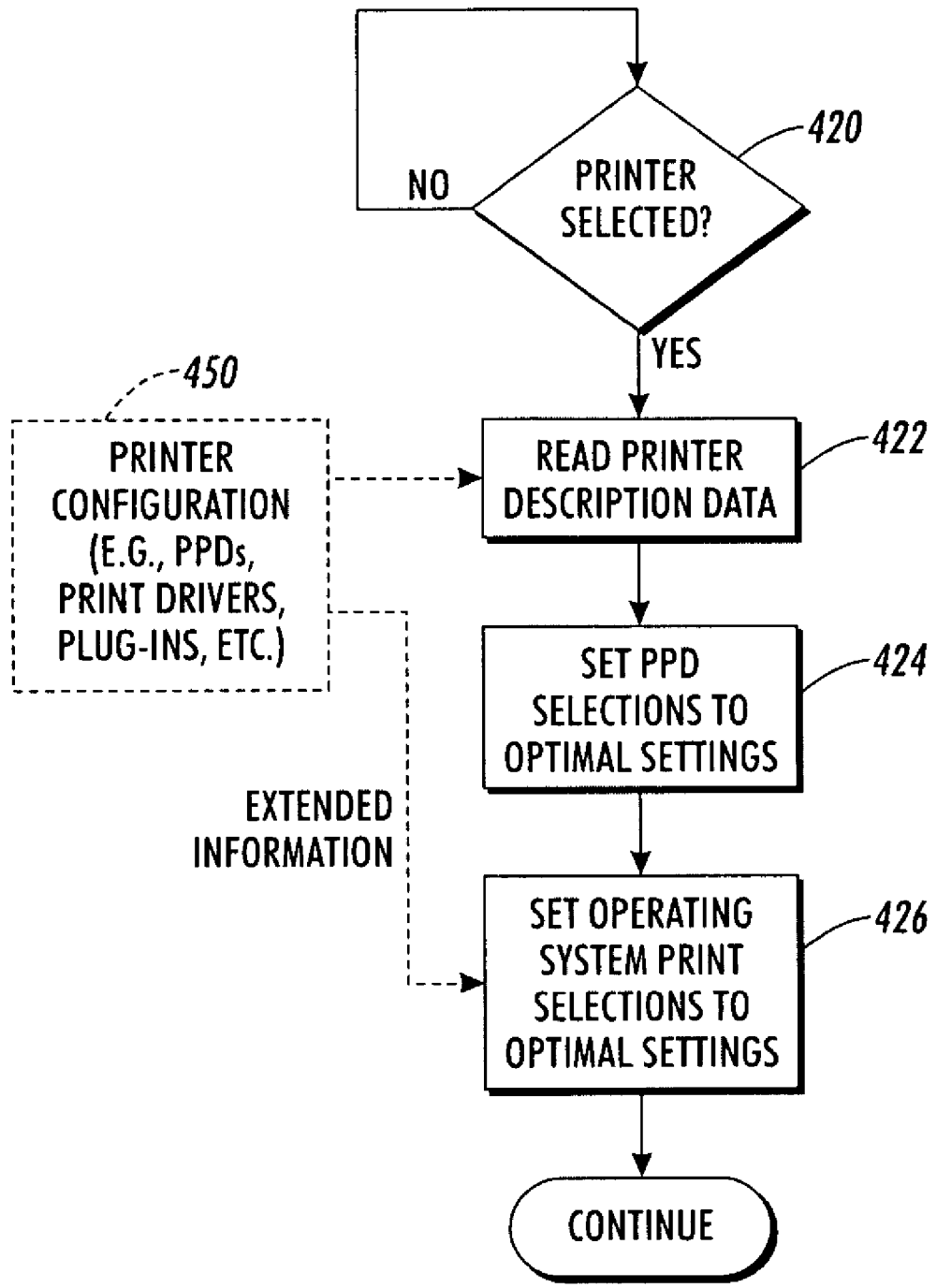
FIG. 4 is an alternative embodiment of a method for print processing disclosed herein.

More specifically, and referring to FIG. 4, when a user selects a printer (420), the system does the following:

1. Reading (422) the printer description data 450, and setting PPD selections to the predetermined optimal settings (424).

2. Subsequently, the system would use the extended information, also present in the printer description file (450), to set operating system print selections to the predetermined optimal settings (426).

The delivery of the functionality of step 426 would vary from operating system to operating system. For example, in a Microsoft Windows environment the system would automatically set all operating system print driver settings to predefined values. Alternatively, in Mac OS X, the system would create and select a new "Preset" (OS equivalent of "Printer Styles"). Once this preset was created, the system would use it when printing to the same kind of printer in the future.

The system may also set application-specific print settings to reflect the information included in the extended printer description files. In a manner analogous to the predetermined optimal settings for the operating system, the system would create application-specific "Printer Styles" for applications that support printer styles. For example, if printing from Microsoft® Word™, the system would simply set all the Word-specific print parameters to reflect the information in the extended printer description. If printing from Quark XPress™ or InDesign™, the system would create a new application "Printer Style". Once this preset was created, the system would use it when printing to the same kind of printer in the future. Hence, the disclosed system and modified printing method expands the notion of predefined print settings to further include operating system and application settings.

In automated end-to-end workflows, job-processing parameters often have a clear dependency to other parameters in the end-to-end workflow. For example, color management parameters, whether they are ICC profile assignment/conversion or color space conversions, are often dependent on the printer model used in the print node. Similarly, offline proofing or print previewing, if done with proper color management, will also have a dependency related to the output device selected in the print node. The methods described above can be further extended to include an enhancement to job-processing parameters in automated prepress systems—thereby enabling values for specific parameters to be derived from other values in the end-to-end workflow.

For job-processing parameters, whose values can be directly derived from other values in the end-to-end workflow, the user will be provided an option to specify or indicate that the value for the job-processing parameter be established dynamically. When the user elects to have a dynamic value for a specific job-processing parameter, the system will present a dialog to the user listing all the job parameters in the current workflow that are acceptable sources for the current job parameter. The user will then select the source job-processing parameter from the list. In order to generate this list, the system will keep a list of job parameters that would be adequate sources for each job-processing parameter whose value could be dynamically evaluated. In a preferred implementation, the attribute values would likely be represented and exchanged using extensible markup language (XML), however, the current disclosure is not intended to be limited to any specific data representation.

Figure 5:
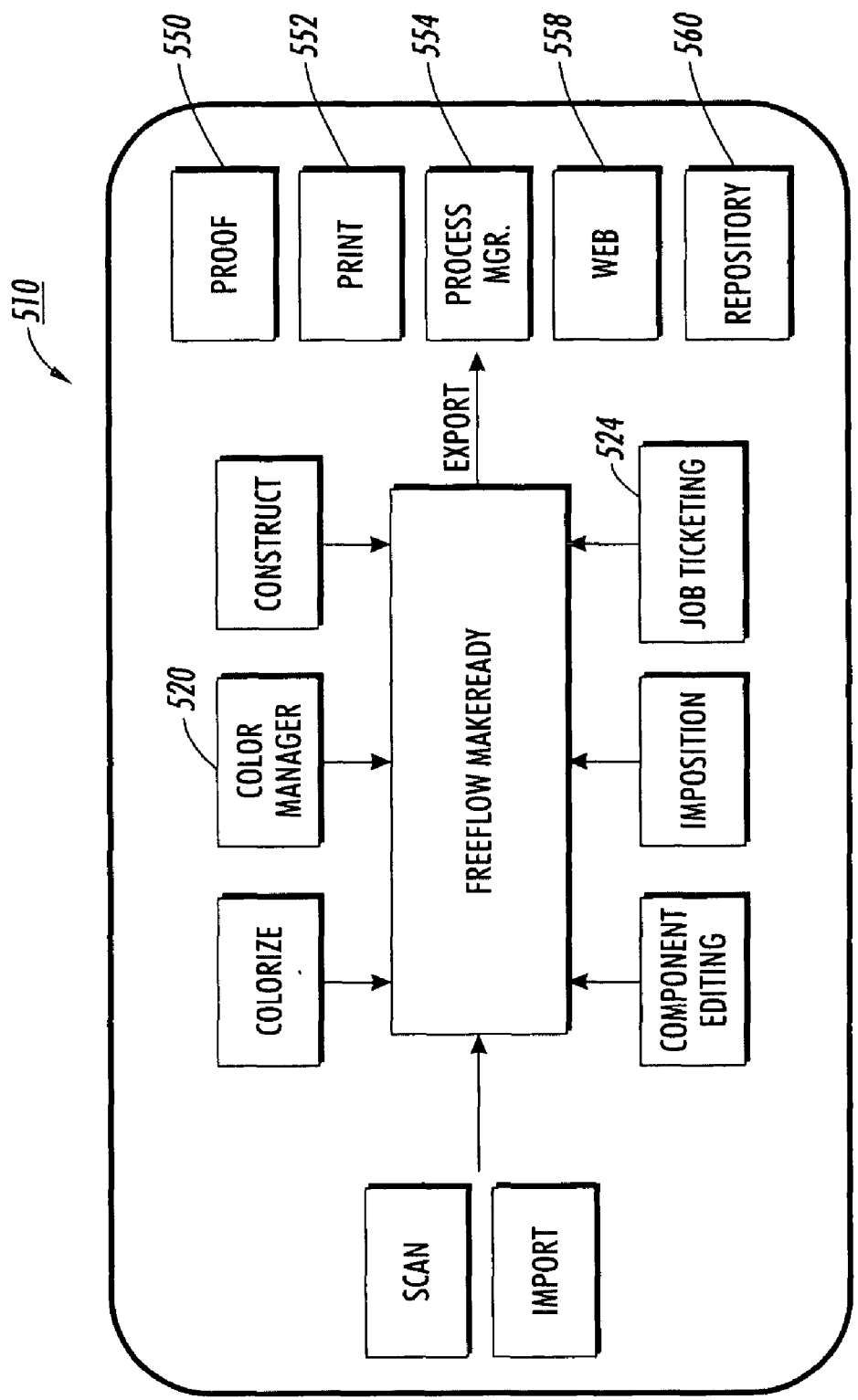
FIG. 5 is an illustrative example of the interrelationships of various system nodes of an exemplary print processing system.

Considering a particular example of this method, as applied to the system 510 depicted in FIG. 5, the output profile value in the Color Management node 520 might have meta-data indicating that it could derive it's setting or value from either the printer model selected in the print process node 554 or it could copy the value from the simulation profile value in a proofing process node 550. Alternatively, in a system where print nodes do not point to a specific printer and instead there is a pool of printers and queues available to the system, the print process node 554 could derive the required value from other values, such as those mentioned above in this example.

In a case where the parameters are not directly correlated to each other, the system will also keep information about how to match up each specific parameter (e.g. the information establishing that a color management process node 520 output ICC profile selection can be linked to a print process node, and will also contain information about how the link is made—a requirement that the printer model must be matched to the color space of the profile). The system will essentially retain information (as in repository 560) about which sets of job-processing parameters can share information with each other. The user is then free to link or not to link these job-processing parameters (e.g., in job ticketing node 524) to each other in any manner the user sees fit.

It will be appreciated that the method, whereby a system or process is established to permit job-processing parameter values to be linked to each other via meta-data (even if the values do not have the same exact data—e.g. associating an ICC profile in color management with a printer model in print) is a unique way of facilitating the optimization of the print job process.

It will also be appreciated that the workflow may be established by, or in conjunction with a virtual printer (e.g., Xerox CXP6000 Color Server). Another, broader alternative for defining or directing the workflow is via an automated pre-press system that may executes a pre-defined series of operations that comprise the "workflow" as used, for example, in Xerox' FreeFlow™ Process Manager. In the FreeFlow system, the "workflows" provide a broad range of functionality and control in relation to specific programming associated with a print job, particularly in order to automate the prepress and printer workflow. A user does not need to program each job if it is submitted to a pre-programmed workflow. Hence, the use of dynamically adjustable parameters may be of significant import—allowing the parameters for a specific job to be established once the workflow has been selected.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for defining a print job, comprising:
providing a collection of printing parameters, wherein the collection includes a plurality of selectable values as a default for at least one printing parameter;
recording a user's selection of an optimal print quality mode as part of a print job definition, thereby enabling the selection of at least one of the plurality of selectable values in association with a persistent data structure; and
submitting the user's selection for printing in association with a print job.

2. The method of claim 1, wherein submitting the user's selection includes providing at least one selectable value to a digital front end system for control of the print job.

3. The method of claim 2, further comprising:
completing the print job; and
storing the user's selection for reuse in association with a subsequent print job.

4. The method of claim 3, wherein the step of providing a collection of printing parameters includes providing an interface on a client terminal to permit the user's selection of the optimal print quality print mode as part of a print job definition; and further including
determining a printer configuration;
acquiring optimal print quality settings for the printer based upon the printer configuration; and
presenting the print quality settings to the user.

5. The method of claim 4, wherein the print quality settings include color settings.

6. The method of claim 4, wherein the print quality settings include image quality settings.

7. The method of claim 4, wherein acquiring optimal print quality settings includes retrieving such settings from a printer.

8. The method of claim 4, wherein acquiring optimal print quality settings includes retrieving such settings from a repository.

9. The method of claim 1, wherein providing a collection of printing parameters further comprises extending the printing parameters to include information about an operating system.

10. The method of claim 9, wherein the printing parameters further include information about a specific application software application within the operating system.

11. The method of claim 1, wherein providing a collection of printing parameters further comprises deriving at least one parameter from other values in an end-to-end workflow.

12. The method of claim 11, further comprising:
displaying an option to indicate that the parameter be established dynamically; and upon selection of the option
listing all parameters in a current workflow that are acceptable sources of information for the parameter that is to be established dynamically.

13. A method for controlling the execution of a print job, comprising:
providing a plurality of services related to printing of the print job for incorporation into the print job workflow;
displaying, via a user interface, a plurality of parameters that control the workflow and the plurality of services in order to obtain printed output as desired by a user; and
selecting at least one parameter for control of at least one of the plurality of services, wherein said selected parameter is derived from at least one other parameter specifying the workflow;
displaying, on the user interface, an option for the user to select that the parameter be established dynamically; and upon selection of the option;

listing, on the user interface, all parameters in a current workflow that are acceptable sources of information for the parameter that is to be established dynamically.

14. The method of claim 13, wherein providing a plurality of services includes creating a workflow with specific services, and where the workflow thereby defines the parameters that may be selected for control.

15. The method of claim 13, wherein providing a plurality of services includes defining a virtual printer with specific printing services defined by the virtual printer, and where the virtual printer thereby defines the parameters that may be selected for control.

16. A method for improving output quality on a digital printing device, comprising:

providing a collection of printing parameters for use by the digital printing device, wherein the collection includes a plurality of selectable values as a default for at least one parameter;

recording a user's selection of an optimal print quality mode as part of a print job definition, thereby enabling the selection of at least one of the plurality of selectable values in association with a persistent data structure; and submitting the user's selection for printing by the digital printing device in association with a print job.

17. The method of claim 16, wherein submitting the user's selection includes providing at least one selectable value to a digital front end system for control of the print job.

18. The method of claim 17, wherein the step of providing a collection of printing parameters includes providing an interface on a client terminal to permit the user to select an optimal print mode as part of a print job definition; and further including determining the digital printing device configuration;

acquiring optimal quality settings for the digital printing device based upon the digital printing device configuration; and presenting the optimal quality settings to the user.

19. The method of claim 16, wherein providing a collection of printing parameters further comprises extending the printing parameters to include information about a source application.

20. The method of claim 16, wherein providing a collection of printing parameters further comprises deriving at least one parameter from other values in an end-to-end workflow.

21. The method of claim 20, further comprising:

displaying an option to indicate that the parameter be established dynamically; and upon selection of the option; and listing, as a function of process nodes in a defined workflow, all parameters that are acceptable sources of information for the parameter that is to be established dynamically.

22. The method of claim 21, wherein the defined workflow is obtained from a predefined workflow selected by the user.

23. A print management system for managing print services, comprising:

a print instruction;

a processor that controls the print services according to said print instruction including a request to produce printed matter;

an acquiring unit that acquires unique data indicative of characteristics of a print service and associates the characteristics with a persistent data structure that can be interpreted by the processor;

a client terminal for generation of the print instruction described in the persistent data structure, and wherein the instruction is based on the unique data indicative of characteristics of the print service, wherein the client terminal further includes, in response to an optimal print quality mode selection, an interface providing at least one selectable value for said print instruction; and an output unit for generating a printed output in response to said print instruction.

24. The print management system of claim 23, further comprising a repository for recording a selection by the user, said selection being available for reuse in association with a subsequent print instruction.

25. The print management system of claim 24, wherein the repository includes a user-specified workflow.

26. The print management system of claim 23, wherein said print instruction includes a parameter that is derived from at least one other value in printing services, and where said processor provides, for display on the user terminal, a collection of parameters at least one of which is selected to be established dynamically.

27. The print management system of claim 26, wherein said print instruction defines specific workflow services, and where the workflow thereby defines at least one parameter that may be selected for dynamic control.

* * * * *